United States Patent
Liu

(10) Patent No.: US 10,969,667 B2
(45) Date of Patent: Apr. 6, 2021

(54) WAVELENGTH CONVERSION MODULE AND PROJECTION DEVICE

(71) Applicant: Coretronic Corporation, Hsin-Chu (TW)

(72) Inventor: Wei-Chi Liu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/876,131

(22) Filed: May 18, 2020

(65) Prior Publication Data

US 2020/0371412 A1 Nov. 26, 2020

(30) Foreign Application Priority Data

May 24, 2019 (CN) .......................... 201920755578.6

(51) Int. Cl.
*G03B 21/16* (2006.01)
*G03B 21/20* (2006.01)
*H04N 9/31* (2006.01)

(52) U.S. Cl.
CPC ........... *G03B 21/16* (2013.01); *G03B 21/204* (2013.01); *G03B 21/2066* (2013.01); *H04N 9/3144* (2013.01)

(58) Field of Classification Search
CPC ..... G03B 21/204; G03B 21/16; H04N 9/3144
USPC .......................................................... 353/54
See application file for complete search history.

(56) References Cited

U.S. PATENT DOCUMENTS

| 9,442,352 | B2 | 9/2016 | Nishimori et al. | |
| 2005/0236144 | A1* | 10/2005 | Takeuchi | H04N 9/3141 165/104.33 |
| 2019/0277486 | A1* | 9/2019 | Nakao | F21S 45/47 |

FOREIGN PATENT DOCUMENTS

| CN | 108983538 | 12/2018 |
| CN | 208459759 | 2/2019 |

* cited by examiner

*Primary Examiner* — Ryan D Howard
(74) *Attorney, Agent, or Firm* — JCIPRNET

(57) ABSTRACT

A wavelength conversion module and a projection device are provided. The projection device includes an illumination system providing an illumination light, a light valve forming the illumination light into an image light, and a projection lens forming the image light into a projection light. The illumination system includes an excitation light source providing an excitation light, and a wavelength conversion module receiving the excitation light. The wavelength conversion module includes a case and a wavelength conversion layer. The case has a liquid inlet, a liquid outlet, and a cavity connecting the liquid inlet and the liquid outlet for circulation of a cooling liquid. The wavelength conversion layer is located on the case, wherein the relative positions of the wavelength conversion layer and the excitation light remain unchanged. The projection device and the wavelength conversion module have good reliability.

22 Claims, 11 Drawing Sheets

WAVELENGTH CONVERSION MODULE AND PROJECTION DEVICE

CROSS-REFERENCE TO RELATED APPLICATION

This application claims the priority benefit of China application serial no. 201920755578.6, filed on May 24, 2019. The entirety of the above-mentioned patent application is hereby incorporated by reference herein and made a part of this specification.

BACKGROUND

Technical Field

The invention relates to an optical module and an optical device, and particularly relates to a wavelength conversion module and a projection device.

Description of Related Art

In recent years, projection devices, which mainly adopt solid-state light sources such as light-emitting diodes (LEDs) and laser diodes, have gradually gained a place in the market. Since a laser diode has a luminous efficiency higher than about 20%, in order to break through the restriction of a light-emitting diode, a laser light source is gradually used for exciting phosphor to generate the solid color light source required for a projector.

However, in general, the current process of manufacturing a phosphor wheel is to apply phosphor or a reflective material mixed with silicone on the substrate of the phosphor wheel to respectively form a wavelength conversion layer or a reflective layer of the phosphor wheel. Then, the substrate of the phosphor wheel is driven by a motor to rotate around the axis, so that different regions of the phosphor wheel enter into the transmission path of the light provided by the laser light source to generate an excitation light. However, silicone has problems such as low heat resistance and deterioration. Therefore, if the laser light excites the phosphor wheel for a long time, the silicone may not withstand the high temperature and may easily deteriorate or burn, which will affect the luminous efficiency and reliability of the phosphor wheel.

The current heat dissipation mechanism for such a phosphor wheel is to increase the light receiving area of the phosphor through rotation of the substrate to lower the temperature of the phosphor, or use the flow field generated by high-speed rotation of the substrate for cooling. Alternatively, an additional fan may be disposed for carrying away the heat on the phosphor with airflow. However, for such a phosphor wheel, as the laser light energy increases, the required motor diameter also increases, which raises the price of the motor and makes it unfavorable for production. In addition, when the phosphor wheel rotates, it generates a lot of vibration and noise, which increases the system noise.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a wavelength conversion module with good reliability.

The invention provides a projection device with good reliability.

Other objectives and advantages of the invention can be further understood from the features disclosed in the disclosure.

In order to achieve one or a part or all of the above or other objectives, an embodiment of the invention provides a wavelength conversion module. The wavelength conversion module is configured to receive an excitation light and includes a case and a wavelength conversion layer. The case has a liquid inlet, a liquid outlet, and a cavity connecting the liquid inlet and the liquid outlet for circulation of a cooling liquid. The wavelength conversion layer is located on the case, wherein the relative positions of the wavelength conversion layer and the excitation light remain unchanged.

In order to achieve one or a part or all of the above or other objectives, an embodiment of the invention provides a projection device. The projection device includes an illumination system, a light valve, and a projection lens. The illumination system provides an illumination light and includes an excitation light source and a wavelength conversion module. The excitation light source provides an excitation light. The wavelength conversion module receives the excitation light and includes a case and a wavelength conversion layer. The case has a liquid inlet, a liquid outlet, and a cavity connecting the liquid inlet and the liquid outlet for circulation of a cooling liquid. The wavelength conversion layer is located on the case, wherein the relative positions of the wavelength conversion layer and the excitation light remain unchanged. The light valve is located on a transmission path of the illumination light and forms the illumination light into an image light. The projection lens is located on a transmission path of the image light and forms the image light into a projection light.

Based on the above, the embodiments of the invention at least have one of the following advantages or effects. According to the embodiments of the invention, in the projection device and the wavelength conversion module, the configuration of the structure of the case allows the cooling liquid to effectively carry away the heat generated when the excitation light is emitted to the wavelength conversion layer of the wavelength conversion module for a long time. Therefore, even if the excitation light is emitted to the same position of the wavelength conversion layer of the wavelength conversion module for a long time, it does not cause a particular portion of the wavelength conversion layer of the wavelength conversion module to generate too much heat or have an excessively high temperature. Thus, the wavelength conversion layer of the wavelength conversion module is in an environment with a stable operating temperature. Accordingly, the projection device and the wavelength conversion module both have good reliability. In addition, since the wavelength conversion module can adopt a structure that is fixed at the same position, it is not required to dispose a large-diameter actuator for rotating the wavelength conversion module with respect to the transmission path of the excitation light. The cost is reduced and is suitable for mass production. Moreover, since the wavelength conversion module remains fixed and does not rotate, vibration and noise in the system are effectively reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
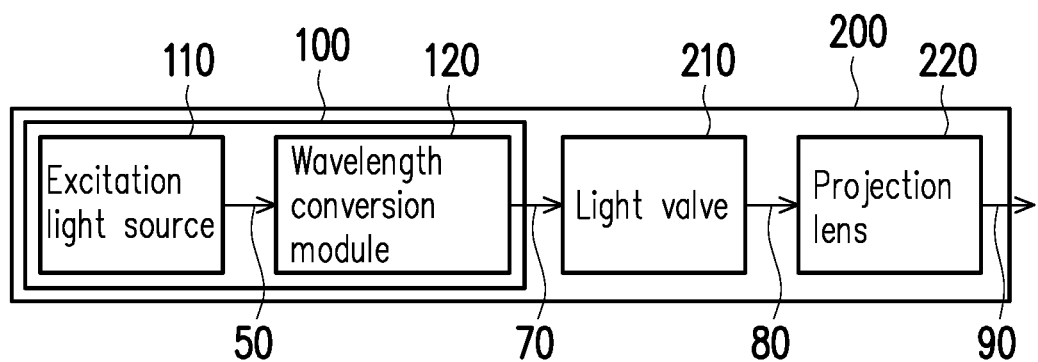
FIG. 1A is a schematic view of the architecture of a projection device according to an embodiment of the invention.
Figure 1B:
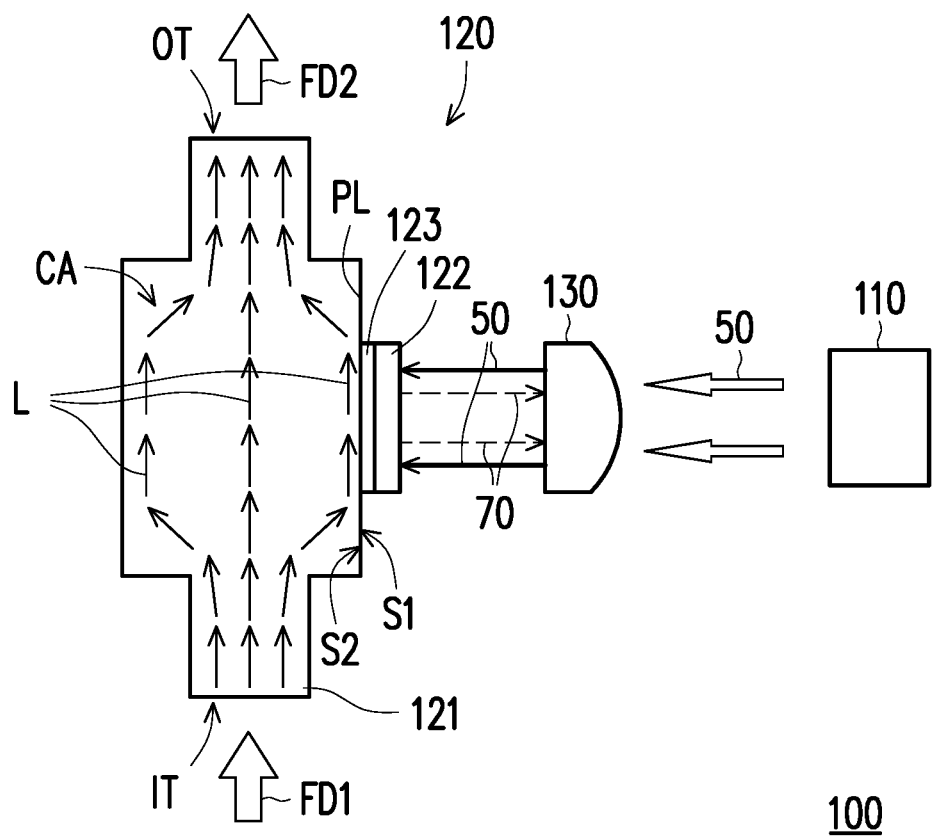
FIG. 1B is a schematic view of the architecture of an illumination system of FIG. 1A.

FIG. 1A is a schematic view of the architecture of a projection device according to an embodiment of the invention. FIG. 1B is a schematic view of the architecture of an illumination system of FIG. 1A. With reference to FIG. 1A and FIG. 1B, a projection device 200 of the embodiment includes an illumination system 100, a light valve 210, and a projection lens 220. The illumination system 100 is configured to provide an illumination light 70. The light valve 210 is located on a transmission path of the illumination light 70 and is configured to form/convert the illumination light 70 into an image light 80. The projection lens 220 is located on a transmission path of the image light 80 and is configured to form the image light 80 into a projection light 90 to be projected onto a screen (not shown). For example, in the embodiment, the light valve 210 is, for example, a digital micro-mirror device (DMD) or a liquid-crystal-on-silicon panel (LCOS panel). However, in other embodiments, the light valve 210 may be a transmissive liquid crystal panel or other light modulators.

Specifically, as shown in FIG. 1A, in the embodiment, the illumination system 100 includes an excitation light source 110 and a wavelength conversion module 120. The excitation light source 110 is configured to emit an excitation light 50. For example, in the embodiment, the excitation light source 110 is a laser light source and the excitation light 50 is a blue laser light. The excitation light source 110 may be light emitting diodes, but the invention is not limited thereto.

Furthermore, as shown in FIG. 1B, in the embodiment, the wavelength conversion module 120 is configured to receive the excitation light 50 and includes a case 121, a wavelength conversion layer 122, and a reflective layer 123. The wavelength conversion layer 122 and the reflective layer 123 are located on the case 121, and the reflective layer 123 is located between the wavelength conversion layer 122 and the case 121. For example, in the embodiment, the case 121 may be made of a material with high thermal conductivity and thus has good thermal conductivity. For example, the material with high thermal conductivity may be metal or silicon. In the embodiment, the case 121 may be formed by one integrally-formed component or may be formed by combining multiple physical components. When the case 121 includes multiple physical components, these physical components are joined by tight fitting, welding, bonding or solid expansion to form the case 121.

Specifically, as shown in FIG. 1B, in the embodiment, the case 121 has a liquid inlet IT, a liquid outlet OT, and a cavity CA connecting the liquid inlet IT and the liquid outlet OT for circulation of a cooling liquid L. To be more specifically, as shown in FIG. 1B, in the embodiment, the case 121 includes a first plate PL. The first plate PL has a first surface S1 and a second surface S2 opposite to each other. The wavelength conversion layer 122 is located on the first surface S1 and the second surface S2 faces the cavity CA. After the cooling liquid L is injected into the cavity CA from the liquid inlet IT, the cooling liquid L flows over the second surface S2 and is discharged/exhausted from the liquid outlet OT. For example, in the embodiment, the cooling liquid L may be a single-phase liquid or a two-phase liquid. The two-phase liquid is, for example, a refrigerant. When the cooling liquid L is a refrigerant, the injected cooling liquid L is transferred from the liquid phase to the gas phase to carry away heat generated by the wavelength conversion layer 122 when flowing over the second surface S2. The single-phase liquid and the two-phase liquid both have higher heat convection coefficients than air, so they can effectively carry away the heat generated when the excitation light 50 is emitted to the wavelength conversion layer 122 of the wavelength conversion module 120 for a long time.

For example, as shown in FIG. 1B, in the embodiment, the cooling liquid L is in a first flow direction FD1 when the cooling liquid L is injected into the cavity CA, and is in a second flow direction FD2 when the cooling liquid L is discharged from the liquid outlet OT. The first flow direction FD1 and the second flow direction FD2 are substantially parallel to each other, and the first flow direction FD1 and the second flow direction FD2 are substantially perpendicular to the normal direction of the second surface S2, but the invention is not limited thereto. In other embodiments, the first flow direction FD1 and the second flow direction FD2 may not be parallel to each other as long as the cooling liquid L flows over the second surface S2.

In addition, as shown in FIG. 1B, in the embodiment, the first surface S1 is a flat surface, and the illumination system 100 further includes a lens element 130. The lens element 130 is located between the excitation light source 110 and the wavelength conversion module 120. For example, in the embodiment, the lens element 130 is a condenser lens, which allows the excitation light 50 to be emitted on the wavelength conversion layer 122 of the wavelength conversion module 120 and form the illumination light 70 of the illumination system 100 via the wavelength conversion layer 122.

With the configuration of the structure of the case 121 of the wavelength conversion module 120, the cooling liquid L can effectively carry away the heat generated when the excitation light 50 is emitted to the wavelength conversion layer 122 of the wavelength conversion module 120 for a long time. Therefore, in the embodiment, even if the excitation light 50 is emitted to the same position of the wavelength conversion layer 122 of the wavelength conversion module 120 for a long time, it does not cause a particular portion of the wavelength conversion layer 122 of the wavelength conversion module 120 to generate too much heat or have an excessively high temperature. Thus, the wavelength conversion layer 122 of the wavelength conversion module 120 is in an environment with a stable operating temperature. Accordingly, the wavelength conversion module 120 has good luminous efficiency and reliability.

Therefore, in the embodiment, the wavelength conversion module 120 can adopt a structure that is fixed at the same position, and it is not required to dispose a large-diameter actuator for rotating the wavelength conversion module 120 with respect to the transmission path of the excitation light 50. In other words, the position of any point of the wavelength conversion module 120 and the relative position of the excitation light 50 can remain unchanged. Since it is not required to dispose a large-diameter actuator, the cost can be reduced for mass production. Moreover, since the wavelength conversion module 120 remains fixed and does not rotate, vibration and noise in the system are effectively reduced.

In the embodiment, since the wavelength conversion module 120 remains fixed and does not rotate, the illumination light 70 formed by the illumination system 100 is a continuous output, and the output timing is not controlled. Nevertheless, the invention is not limited thereto. In other embodiments, the wavelength conversion module 120 may also be provided with other components to form an illumination light 70 having a controllable output timing. People of ordinary skills in the art may make appropriate changes to the optical path after referring to the invention. Nevertheless, such changes still fall within the scope of the invention. Some embodiments will be provided hereinafter as illustrations.

Figure 2A:
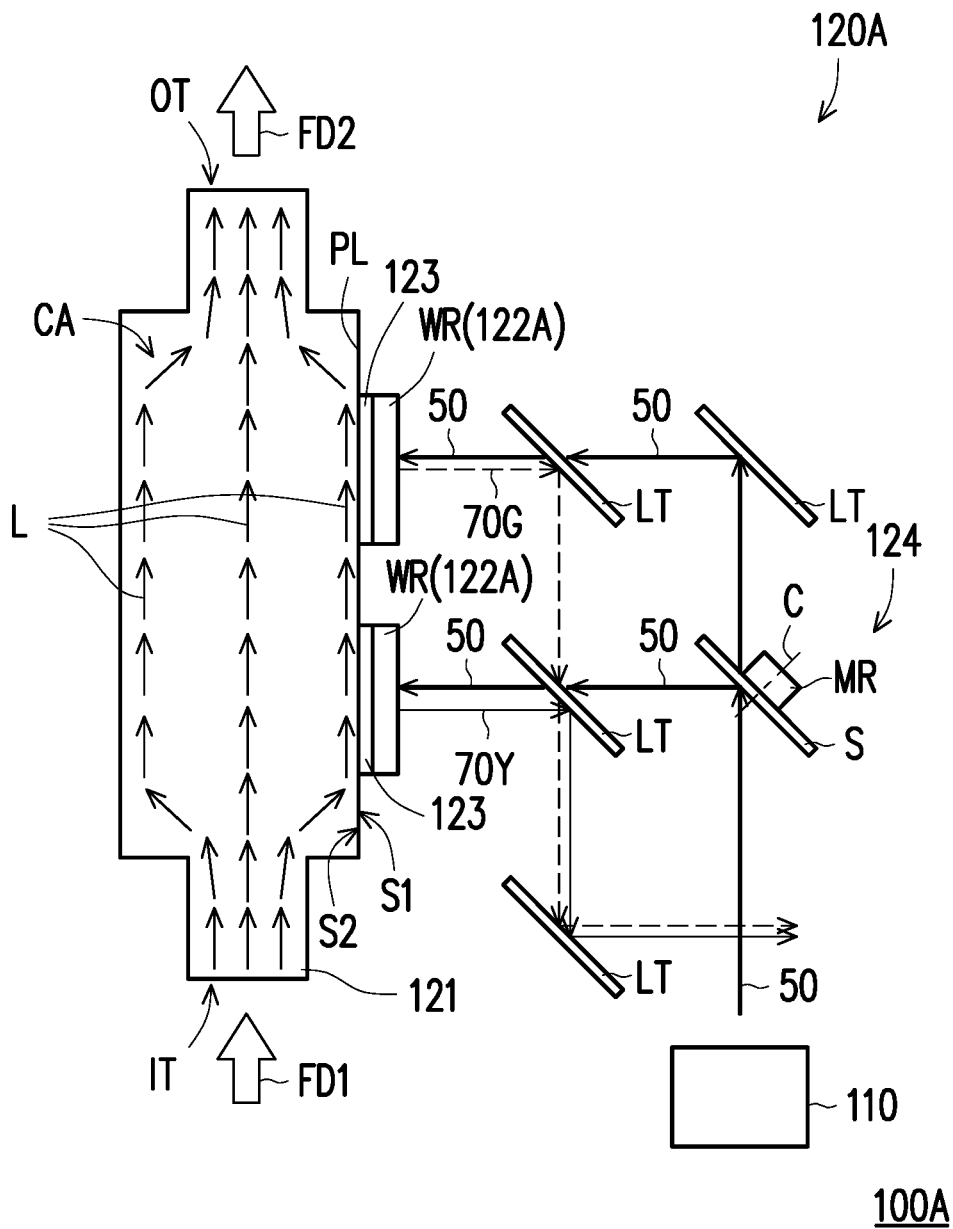
FIG. 2A is a schematic view of the architecture of another illumination system of FIG. 1A.
Figure 2B:
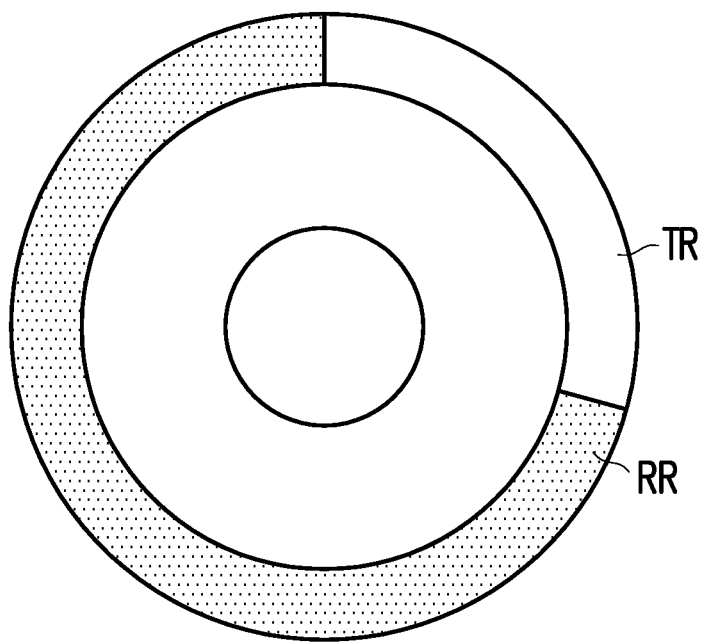
FIG. 2B is a schematic view of the structure of a reflective wheel of FIG. 2A.

FIG. 2A is a schematic view of the architecture of another illumination system of FIG. 1A. FIG. 2B is a schematic view of the structure of a reflective wheel of FIG. 2A. With reference to FIG. 2A, an illumination system 100A of the embodiment is similar to the illumination system 100 of FIG. 1B, and the differences between the two are as follows. As shown in FIG. 2A, in the embodiment, the wavelength conversion module 120A further includes a reflective wheel 124, and the lens element 130 is omitted. The reflective wheel 124 is located on the transmission path of the excitation light 50, wherein the reflective wheel 124 includes a substrate S, an axis C, and an actuator MR. For example, in the embodiment, the actuator MR may be a small-diameter motor (motor).

Specifically, as shown in FIG. 2A and FIG. 2B, in the embodiment, the actuator MR is configured to rotate the substrate S around the axis C, and the substrate S of the reflective wheel 124 has a transmissive region TR and a reflective region RR. When the substrate S rotates, the transmissive region TR and the reflective region RR alternately enter into the transmission path of the excitation light 50. When the reflective region RR enters into the transmission path of the excitation light 50, the excitation light 50 is transmitted to the wavelength conversion layer 122A via the reflective wheel 124.

Furthermore, as shown in FIG. 2A and FIG. 2B, in the embodiment, the wavelength conversion layer 122A has a plurality of wavelength conversion regions WR, and the wavelength conversion regions WR are separated from each other. The wavelength conversion module 120A further includes a light transmission element LT. The light transmission element LT is located on the transmission path of the excitation light 50. When the reflective region RR of the reflective wheel 124 enters into the transmission path of the excitation light 50, the excitation light 50 is transmitted to one of the wavelength conversion regions WR via the reflective wheel 124 to form an illumination light 70Y. When the transmissive region TR of the reflective wheel 124 enters into the transmission path of the excitation light 50, the excitation light 50 passes through the reflective wheel 124 and is transmitted to the light transmission element LT.

The light transmission element LT transmits the excitation light 50 to another of the wavelength conversion regions WR to form another illumination light 70G.

Accordingly, the wavelength conversion module 120A controls the output timing of the illumination light 70 by adjusting the ranges of the transmissive region TR and the reflective region RR of the reflective wheel 124, and through the configuration of the light transmission element LT and the wavelength conversion regions WR of the wavelength conversion layer 122A, forms illumination lights 70 of different colors at different timings. Therefore, the wavelength conversion module 120A may be used in combination with a filter module in the optical path thereafter, and the illumination light 70 transmitted to the light valve 210 may be synchronized with the timing of the light valve 210 for the projection lens 220 to project a desired color picture.

In addition, in the embodiment, since the case 121 of the wavelength conversion module 120A of the illumination system 100A has a similar structure to the case 121 of the wavelength conversion module 120 of the illumination system 100, the wavelength conversion module 120A may also rely on the cooling liquid L therein to effectively carry away the heat generated when the excitation light 50 is emitted to the wavelength conversion layer 122A of the wavelength conversion module 120A for a long time. Therefore, the wavelength conversion module 120A provides a function similar to that of the wavelength conversion module 120 of FIG. 1B, and achieves effects and advantages similar to those of the wavelength conversion module 120, which will not be further explained here. Moreover, when the illumination system 100A including the wavelength conversion module 120A is applied to the projection device 200 of FIG. 1A, the projection device 200 also achieves similar effects and advantages, which will not be further explained here.

Figure 3:
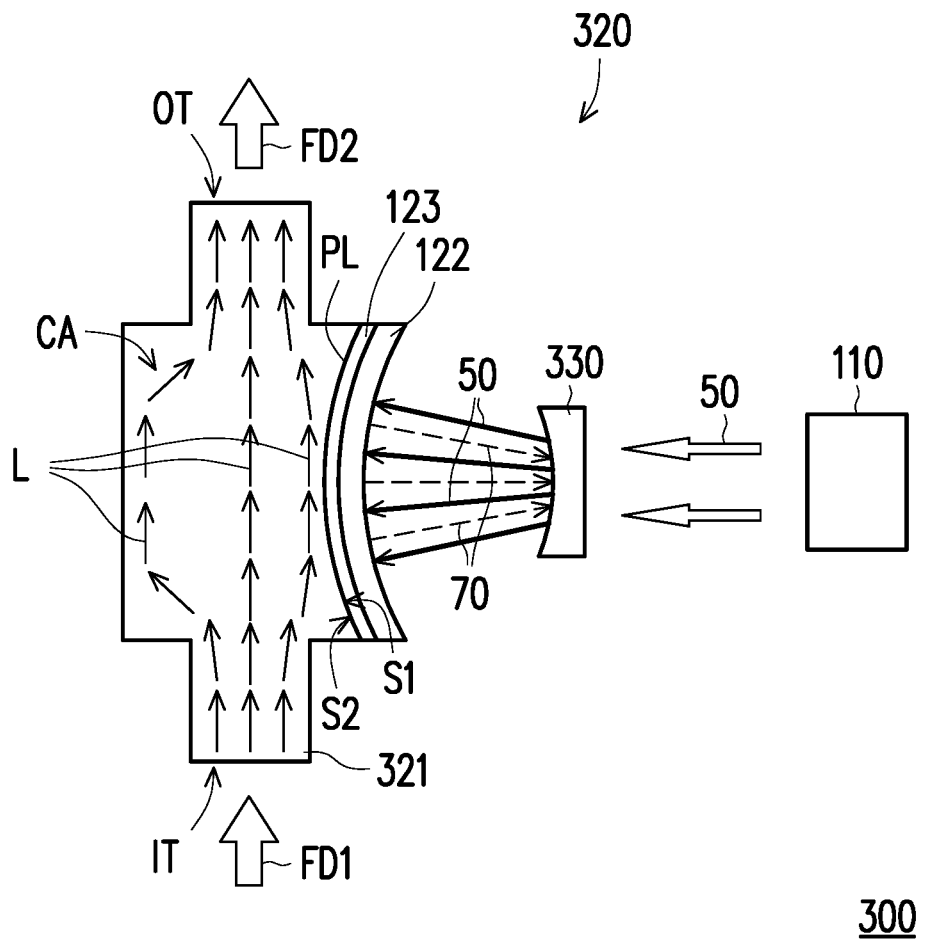
FIG. 3 is a schematic view of the architecture of yet another illumination system of FIG. 1A.

FIG. 3 is a schematic view of the architecture of yet another illumination system of FIG. 1A. With reference to FIG. 3, the illumination system 300 of the embodiment is similar to the illumination system 100 of FIG. 1B, and the differences between the two are as follows. As shown in FIG. 3, in the embodiment, the first surface S1 of the case 321 of the wavelength conversion module 320 is a curved surface, and the first surface S1 is recessed into the case 321 toward the excitation light 50. Also, in the embodiment, the lens element 330 is a divergent lens. Thus, the size of the light spot formed by the excitation light 50 on the first surface S1 is enlarged, and the heat generated when the excitation light 50 is emitted to the wavelength conversion layer 122 of the wavelength conversion module 320 is more evenly dispersed, thereby improving the luminous efficiency and reliability of the wavelength conversion module 320 of the illumination system 300.

In addition, in the embodiment, since the case 321 of the wavelength conversion module 320 of the illumination system 300 has a similar structure to the case 121 of the wavelength conversion module 120 of the illumination system 100, the wavelength conversion module 320 may also rely on the cooling liquid L therein to effectively carry away the heat generated when the excitation light 50 is emitted to the wavelength conversion layer 122 of the wavelength conversion module 320 for a long time. Therefore, the wavelength conversion module 320 provides a function similar to that of the wavelength conversion module 120 of FIG. 1B, and achieves effects and advantages similar to those of the wavelength conversion module 120, which will not be further explained here. Moreover, when the illumination system 300 including the wavelength conversion module 320 is applied to the projection device 200 of FIG. 1A, the projection device 200 also achieves similar effects and advantages, which will not be further explained here.

Figure 4:
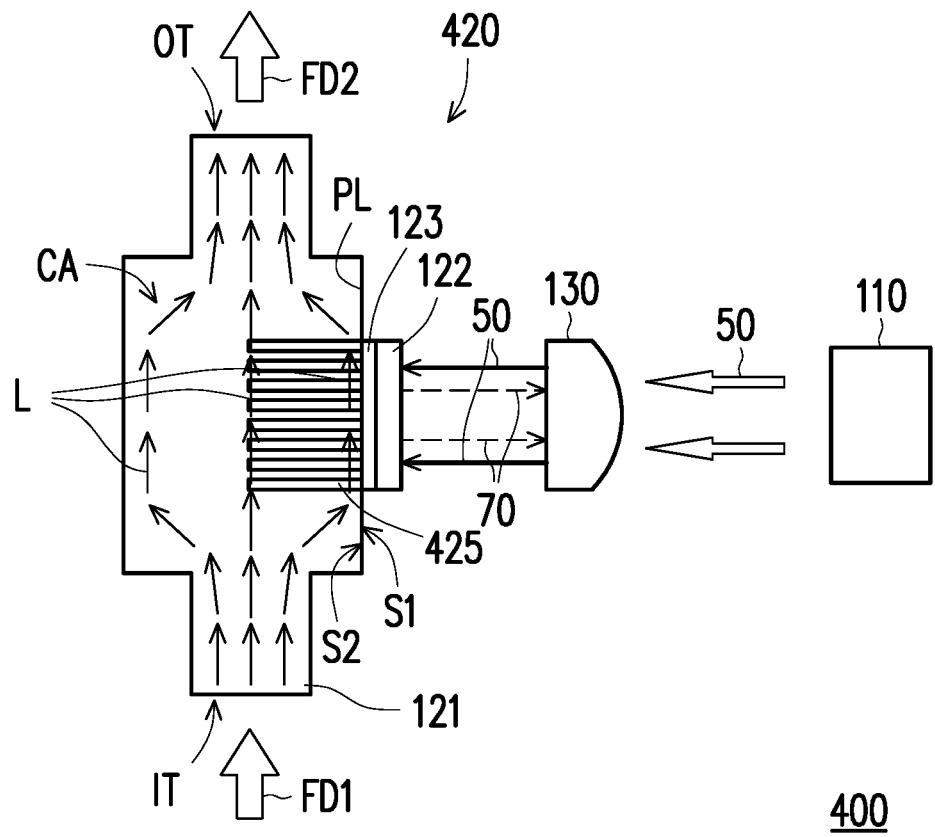
FIG. 4 is a schematic view of the architecture of yet another illumination system of FIG. 1A.

FIG. 4 is a schematic view of the architecture of yet another illumination system of FIG. 1A. With reference to FIG. 4, the illumination system 400 of the embodiment is similar to the illumination system 100 of FIG. 1B, and the differences between the two are as follows. As shown in FIG. 4, the wavelength conversion module 420 further includes a plurality heat transfer enhancement structures 425. The heat transfer enhancement structures 425 are located on the second surface S2 of the first plate PL and are disposed corresponding to the wavelength conversion layer 122. Specifically, the heat transfer enhancement structures 425 are located in the cavity CA and disposed on the second surface S2 of the first plate PL corresponding to the wavelength conversion layer 122. More specifically, in the embodiment, the heat transfer enhancement structures 425 are disposed corresponding to the light spot formed by the excitation light 50 on the first surface S1, and the size of the distribution range of the heat transfer enhancement structures 425 on the second surface S2 of the first plate PL is larger than the size of the light spot. For example, the heat transfer enhancement structures 425 and the case 121 may be an integrally-formed structure or separate structures. If the heat transfer enhancement structures 425 and the case 121 are separate structures, the heat transfer enhancement structures 425 may be joined with the case 121 by tight fitting, welding, bonding or solid expansion. For example, in the embodiment, the heat transfer enhancement structure 425 may be a fin structure or a porous material. Further, the fin structure may be a plate structure, a column structure, or a wing structure and may have an opening or a concave-convex object thereon.

Possible forms of the heat transfer enhancement structure 425 of FIG. 4 are further illustrated below with reference to FIG. 5A to FIG. 5G.

Figure 5A:
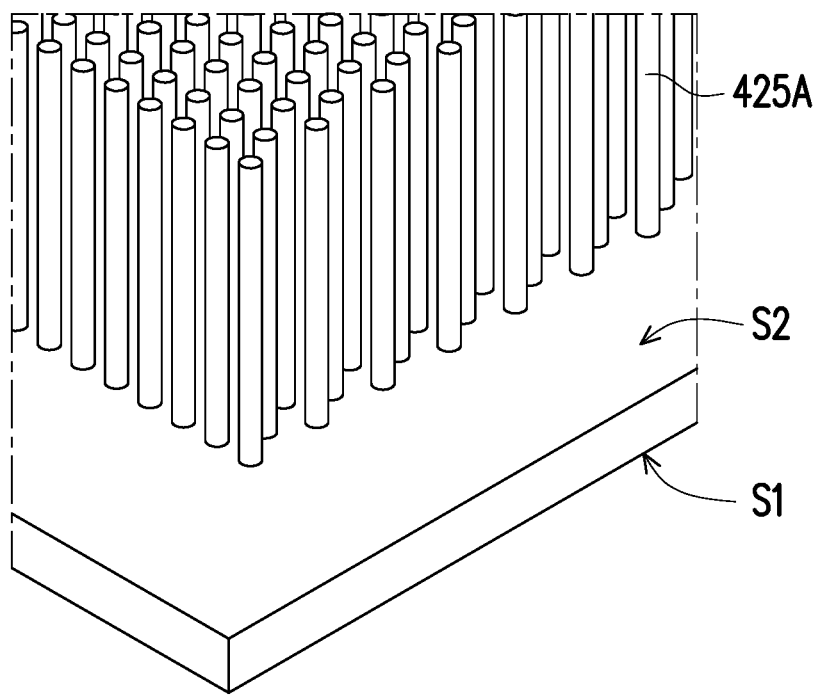
FIG. 5A is a schematic view of the structure of a heat transfer enhancement structure of FIG. 4.
Figure 5B:
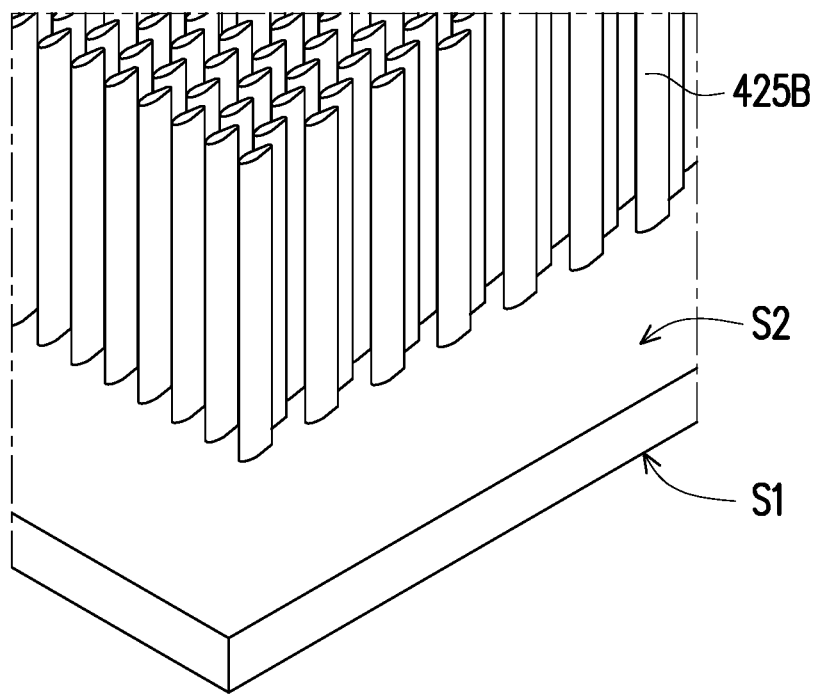
FIG. 5B is a schematic view of the structure of another heat transfer enhancement structure of FIG. 4.
Figure 5C:
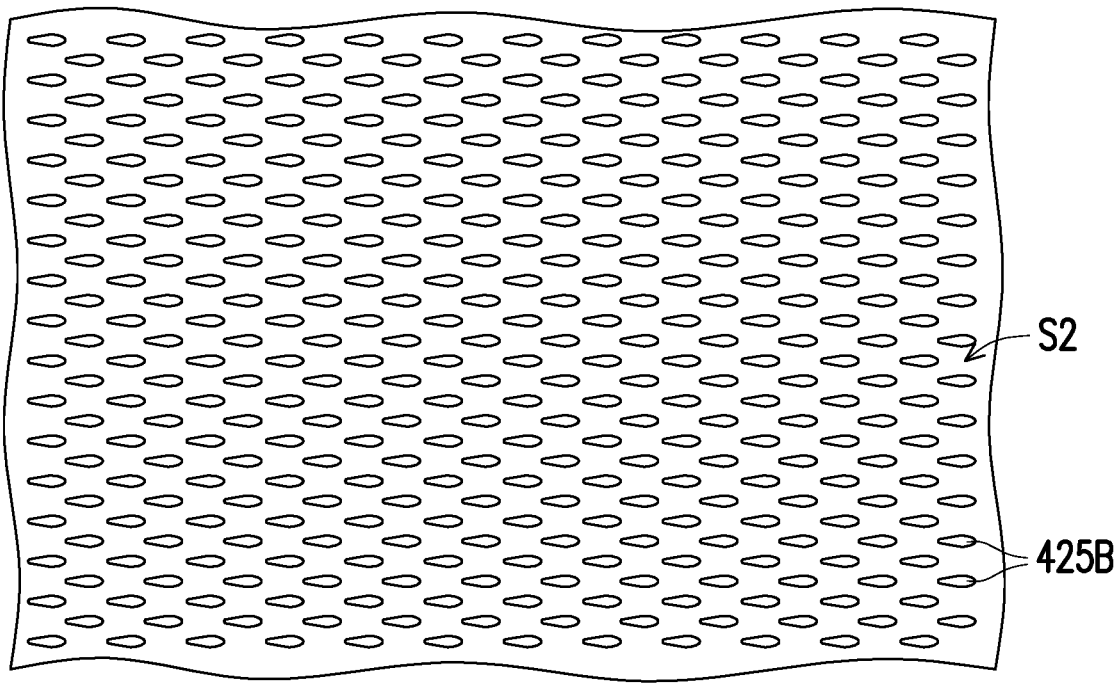
FIG. 5C is a schematic top view of the heat transfer enhancement structure of FIG. 5B.

FIG. 5A is a schematic view of the structure of a heat transfer enhancement structure of FIG. 4. FIG. 5B is a schematic view of the structure of another heat transfer enhancement structure of FIG. 4. FIG. 5C is a schematic top view of the heat transfer enhancement structure of FIG. 5B. As shown in FIG. 5A to FIG. 5C, in these embodiments, the heat transfer enhancement structures 425A and 425B may be fin structures. Also, as shown in FIG. 5A, the heat transfer enhancement structure 425A (fin structure) may be a column structure. On the other hand, as shown in FIG. 5B to FIG. 5C, the heat transfer enhancement structure 425B (fin structure) may be a wing structure. Therefore, with the configuration of the heat transfer enhancement structures 425A and 425B, the cooling liquid (not shown) flowing above may carry away the heat more quickly and efficiently.

Figure 5D:
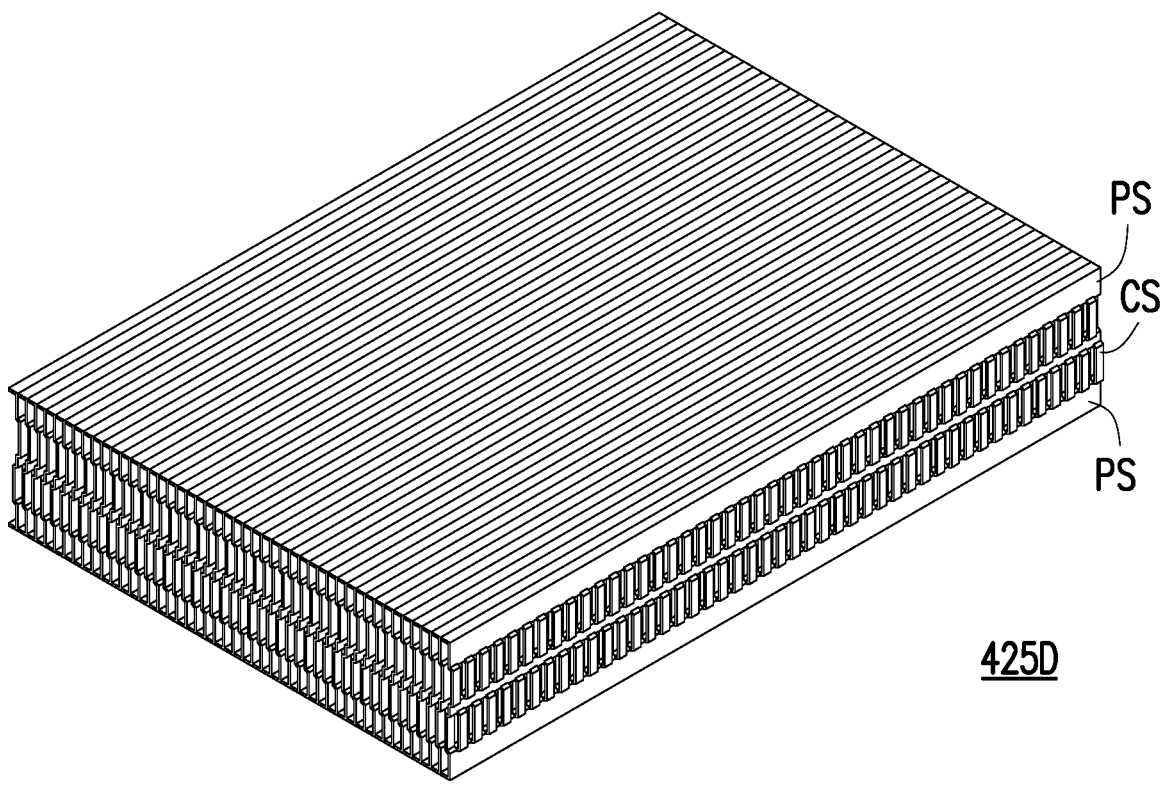
FIG. 5D is a schematic view of the structure of yet another heat transfer enhancement structure of FIG. 4.
Figure 5E:
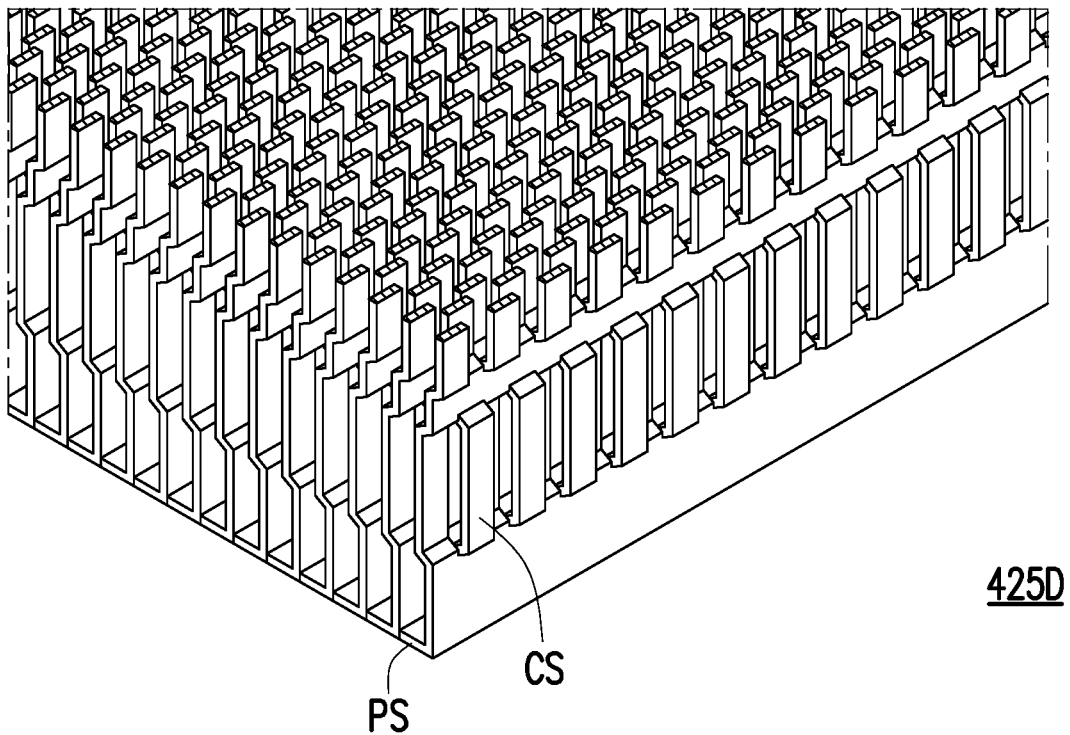
FIG. 5E is a schematic view of the heat transfer enhancement structure of FIG. 5D.
Figure 5F:
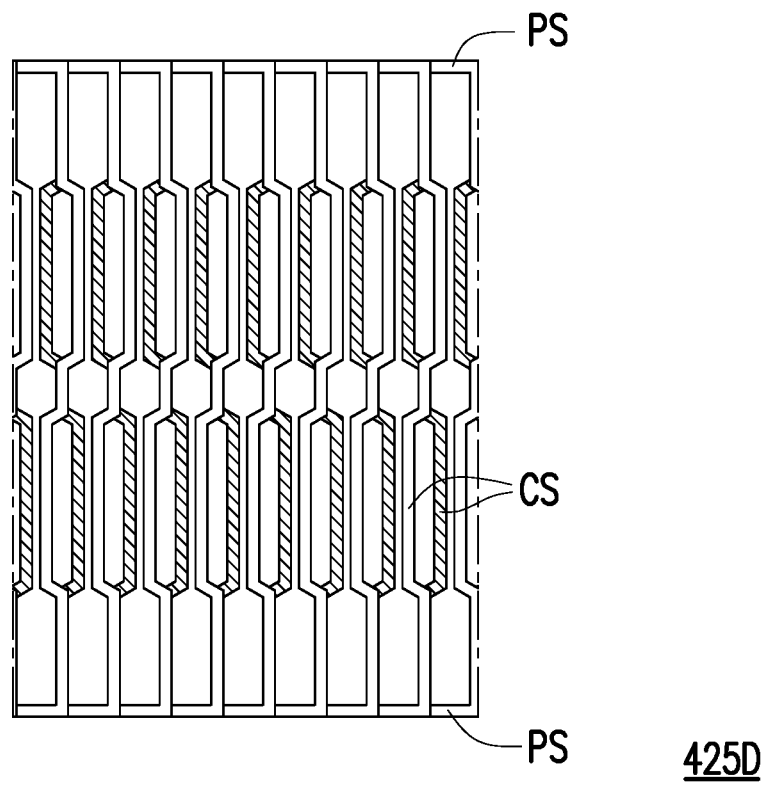
FIG. 5F is a schematic side view of the heat transfer enhancement structure of FIG. 5D.

FIG. 5D is a schematic view of the structure of yet another heat transfer enhancement structure of FIG. 4. FIG. 5E is a schematic view of the heat transfer enhancement structure of FIG. 5D. FIG. 5F is a schematic side view of the heat transfer enhancement structure of FIG. 5D. As shown in FIG. 5D to FIG. 5F, in the embodiment, the heat transfer enhancement structure 425D includes two plate structures PS and a concave-convex structure CS located between the two plate structures PS. Therefore, the cooling liquid (not shown) may flow through the flow path formed in the concave-convex structure CS to carry away the heat more quickly and efficiently.

Figure 5G:
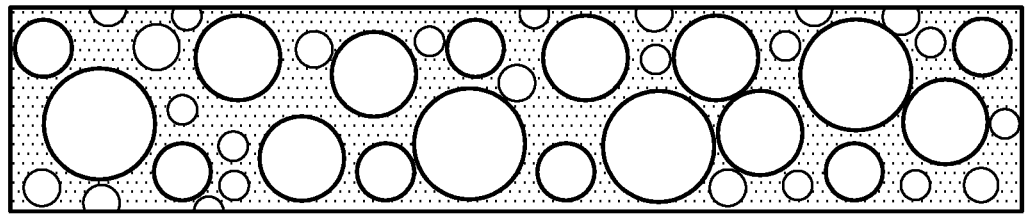
FIG. 5G is a schematic view of the structure of yet another heat transfer enhancement structure of FIG. 4.

FIG. 5G is a schematic view of the structure of yet another heat transfer enhancement structure of FIG. 4. As shown in FIG. 5G, in the embodiment, the heat transfer enhancement structure 425G may be a porous material. Thus, the pores in the porous material may increase the contact area between the cooling liquid (not shown) flowing therein and the heat transfer enhancement structure 425G for the cooling liquid (not shown) to carry away the heat more quickly and efficiently.

Therefore, the configuration of these heat transfer enhancement structures 425 (that is, the heat transfer enhancement structures 425A, 425B, 425D, and 425G) improves the heat transfer coefficient between the cooling liquid L and the case 121, and more quickly and efficiently carries away the heat generated when the excitation light 50 is emitted to the wavelength conversion layer 122 of the wavelength conversion module 420 for a long time, thereby improving the luminous efficiency and reliability of the wavelength conversion module 420 of the illumination system 400.

In addition, in the embodiment, since the case 121 of the wavelength conversion module 420 of the illumination system 400 has a similar structure to the case 121 of the wavelength conversion module 120 of the illumination system 100, the wavelength conversion module 420 may also rely on the cooling liquid L therein to effectively carry away the heat generated when the excitation light 50 is emitted to the wavelength conversion layer 122 of the wavelength conversion module 420 for a long time. Therefore, the wavelength conversion module 420 provides a function similar to that of the wavelength conversion module 120 of FIG. 1B, and achieves effects and advantages similar to those of the wavelength conversion module 120, which will not be further explained here. Moreover, when the illumination system 400 including the wavelength conversion module 420 is applied to the projection device 200 of FIG. 1A, the projection device 200 also achieves similar effects and advantages, which will not be further explained here.

Figure 6:
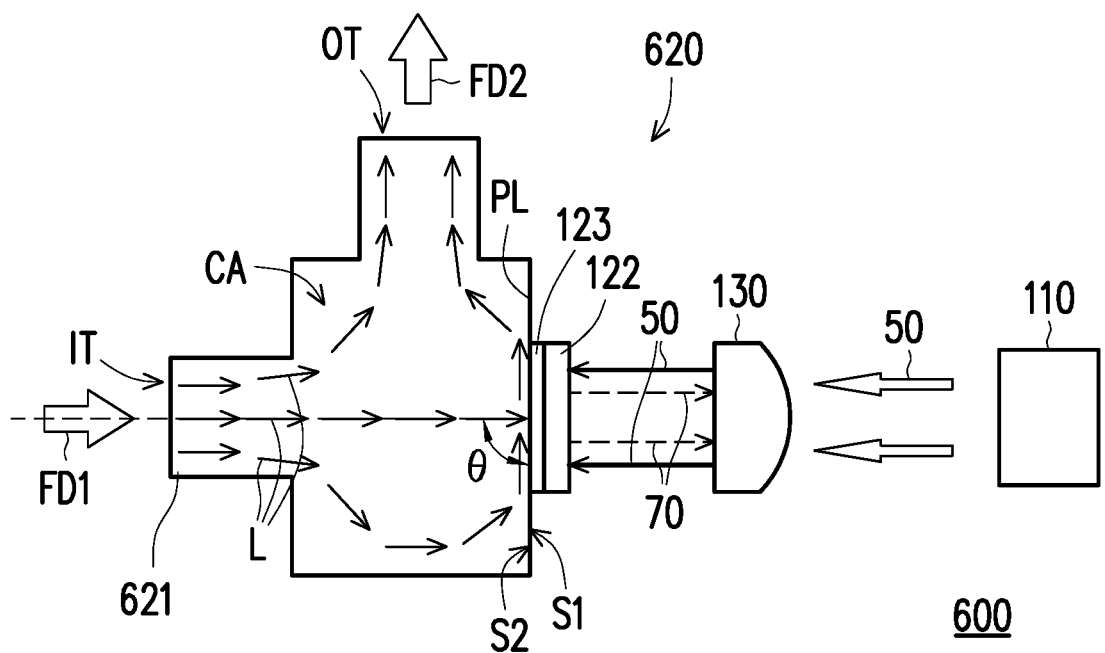
FIG. 6 is a schematic view of the architecture of yet another illumination system of FIG. 1A.

FIG. 6 is a schematic view of the architecture of yet another illumination system of FIG. 1A. With reference to FIG. 6, the illumination system 600 of the embodiment is similar to the illumination system 100 of FIG. 1B, and the differences between the two are as follows. As shown in FIG. 6, in the embodiment, the first flow direction FD1 of the cooling liquid L injected into the cavity CA from the liquid inlet IT is not parallel to the second flow direction FD2 of the cooling liquid L discharged from the liquid outlet OT, wherein the first flow direction FD1 is toward the first surface S1 and has an angle θ with respect to the first surface S1. As shown in FIG. 6, in the embodiment, the angle θ is about 90 degrees. Therefore, when the cooling liquid L flows toward the first surface S1, the cooling liquid L generates an impact cooling effect and more quickly and efficiently carries away the heat generated when the excitation light 50 is emitted to the wavelength conversion layer 122 of the wavelength conversion module 620 for a long time, thereby improving the luminous efficiency and reliability of the wavelength conversion module 620 of the illumination system 600.

In addition, in the embodiment, since the case 621 of the wavelength conversion module 620 of the illumination system 600 has a similar structure to the case 121 of the wavelength conversion module 120 of the illumination system 100, the wavelength conversion module 620 may also rely on the cooling liquid L therein to effectively carry away the heat generated when the excitation light 50 is emitted to the wavelength conversion layer 122 of the wavelength conversion module 620 for a long time. Therefore, the wavelength conversion module 620 provides a function similar to that of the wavelength conversion module 120 of FIG. 1B, and achieves effects and advantages similar to those of the wavelength conversion module 120, which will not be further explained here. Moreover, when the illumination system 600 including the wavelength conversion module 620 is applied to the projection device 200 of FIG. 1A, the projection device 200 also achieves similar effects and advantages, which will not be further explained here.

Figure 7A:
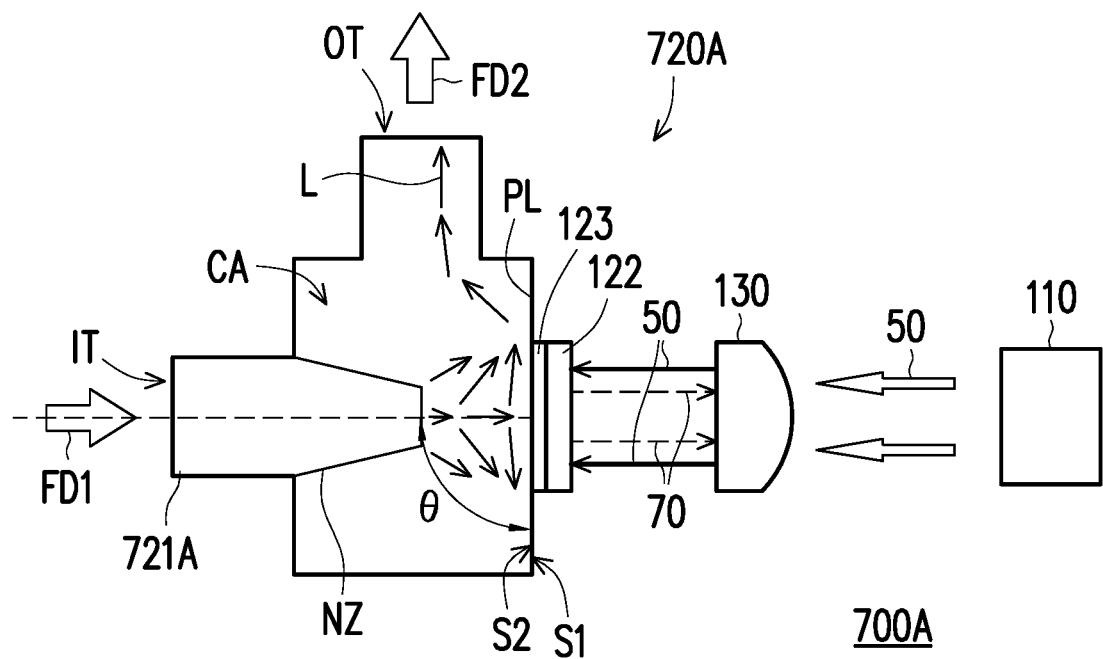
FIG. 7A is a schematic view of the architecture of yet another illumination system of FIG. 1A.
Figure 7B:
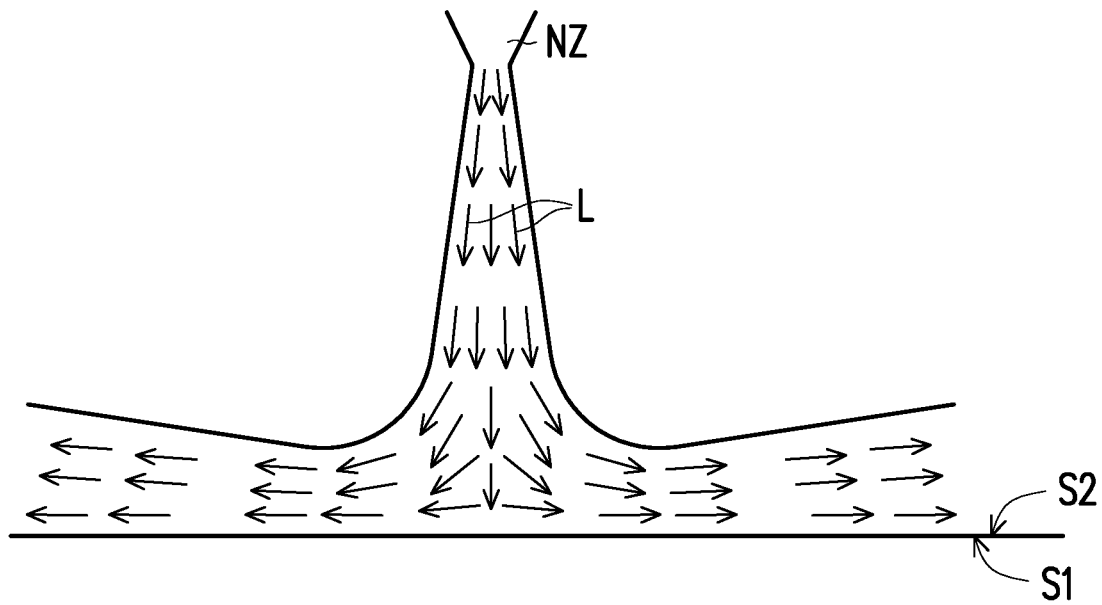
FIG. 7B is a schematic view of the flow field of the liquid ejected through the nozzle of FIG. 7A.
Figure 7C:
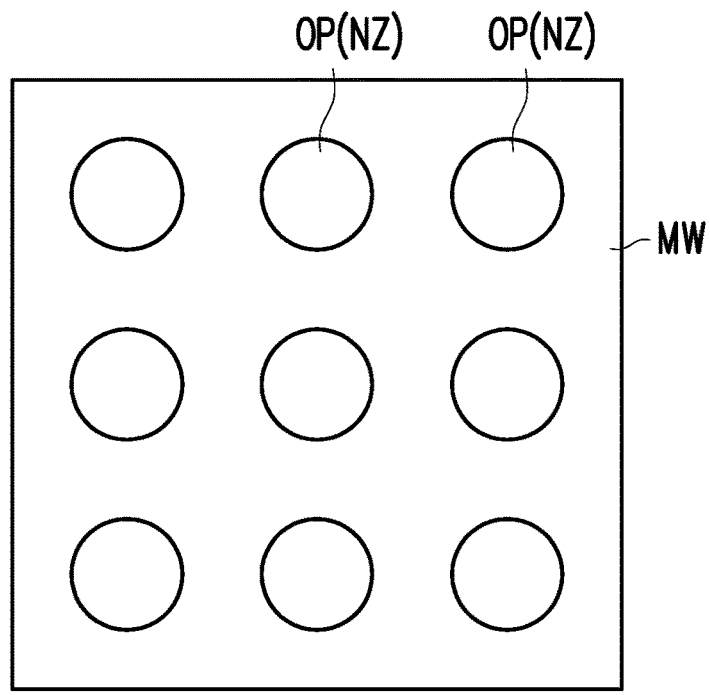
FIG. 7C is a schematic top view of another case of FIG. 7A.

FIG. 7A is a schematic view of the architecture of yet another illumination system of FIG. 1A. FIG. 7B is a schematic view of the flow field of the liquid ejected through a nozzle of FIG. 7A. FIG. 7C is a schematic top view of another case of FIG. 7A. With reference to FIG. 7A, the illumination system 700A of the embodiment is similar to the illumination system 600 of FIG. 6, and the differences between the two are as follows. As shown in FIG. 7A, in the embodiment, the case 721A of the wavelength conversion module 720A further includes at least one nozzle NZ. The at least one nozzle NZ is located in the cavity CA and is connected to the liquid inlet IT of the case 721A. The cooling liquid L flows toward the first surface S1 via the at least one nozzle NZ. Therefore, as shown in FIG. 7B, in the embodiment, the configuration of the nozzle NZ enhances the impact cooling effect that is generated when the cooling liquid L flows toward the first surface S1, and more quickly and efficiently carries away the heat generated when the excitation light 50 is emitted to the wavelength conversion layer 122 of the wavelength conversion module 720A for a long time, thereby improving the luminous efficiency and reliability of the wavelength conversion module 720A of the illumination system 700A. In addition, in the embodiment, the number of the at least one nozzle NZ is not particularly limited. For example, as shown in FIG. 7C, in the embodiment, more than one nozzle NZ may be provided, which may be located on a multi-hole plate MW of the case 721A and may be formed by a plurality of openings OP of the multi-hole plate MW.

Figure 7D:
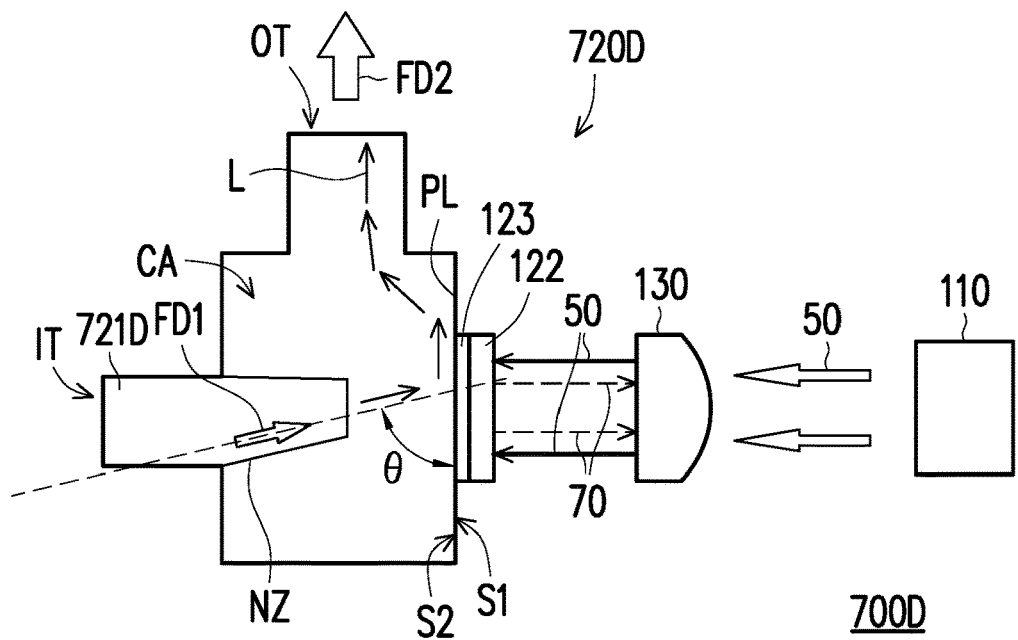
FIG. 7D is a schematic view of the architecture of yet another illumination system of FIG. 1A.

FIG. 7D is a schematic view of the architecture of yet another illumination system of FIG. 1A. With reference to FIG. 7D, the illumination system 700D of the embodiment is similar to the illumination system 700A of FIG. 7A, and the differences between the two are as follows. As shown in FIG. 7D, in the embodiment, the range of the angle θ between the first flow direction FD1 of the cooling liquid L and the first surface S1 may be adjusted through the configuration of the nozzle NZ of the wavelength conversion module 720D. For example, in the embodiment, the angle θ may be in a range of 45 degrees to 90 degrees, which also enhances the impact cooling effect generated when the cooling liquid L flows toward the first surface S1, and more quickly and efficiently carries away the heat generated when the excitation light 50 is emitted to the wavelength conversion layer 122 of the wavelength conversion module 720D for a long time, thereby improving the luminous efficiency and reliability of the wavelength conversion module 720D of the illumination system 700D.

Similarly, in the embodiments of FIG. 7A and FIG. 7D, since the cases 721A and 721D of the wavelength conversion modules 720A and 720D of the illumination systems 700A and 700D have similar structures to the case 621 of the wavelength conversion module 620 of the illumination system 600, the wavelength conversion modules 720A and 720D may also rely on the cooling liquid L therein to effectively carry away the heat generated when the excitation light 50 is emitted to the wavelength conversion layers 122 of the wavelength conversion modules 720A and 720D for a long time. Therefore, the wavelength conversion modules 720A and 720D provide a function similar to that of the wavelength conversion module 620 of FIG. 6, and achieve effects and advantages similar to those of the wavelength conversion module 620, which will not be further explained here. Moreover, when the illumination systems 700A and 700D including the wavelength conversion modules 720A and 720D are applied to the projection device 200 of FIG. 1A, the projection device 200 also achieves similar effects and advantages, which will not be further explained here.

Based on the above, the embodiments of the invention at least have one of the following advantages or effects. According to the embodiments of the invention, in the projection device and the wavelength conversion module, the configuration of the structure of the case allows the cooling liquid to effectively carry away the heat generated when the excitation light is emitted to the wavelength conversion layer of the wavelength conversion module for a long time. Therefore, even if the excitation light is emitted to the same position of the wavelength conversion layer of the wavelength conversion module for a long time, it does not cause a particular portion of the wavelength conversion layer of the wavelength conversion module to generate too much heat or have an excessively high temperature. Thus, the wavelength conversion layer of the wavelength conversion module is in an environment with a stable operating temperature. Accordingly, the projection device and the wavelength conversion module both have good reliability. In addition, since the wavelength conversion module can adopt a structure that is fixed at the same position, it is not required to dispose a large-diameter actuator for rotating the wavelength conversion module with respect to the transmission path of the excitation light. The cost is reduced and is suitable for mass production. Moreover, since the wavelength conversion module remains fixed and does not rotate, vibration and noise in the system are effectively reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, configured to receive an excitation light and comprising: a case and a wavelength conversion layer, wherein:
   the case comprises a liquid inlet, a liquid outlet, a cavity connecting the liquid inlet and the liquid outlet for circulation of a cooling liquid, and a first plate having a first surface and a second surface opposite to each other;
   the wavelength conversion layer is located on the first surface of the first plate of the case, wherein relative positions of the wavelength conversion layer and the excitation light remain unchanged, the second surface faces the cavity, and the cooling liquid is injected into the cavity from the liquid inlet, then flows over the second surface and is discharged from the liquid outlet; and
   the cooling liquid is in a first flow direction when injected into the cavity from the liquid inlet and is in a second flow direction when discharged from the liquid outlet, the first flow direction and the second flow direction are parallel to each other, and the first flow direction and the second flow direction are perpendicular to a normal direction of the second surface.

2. The wavelength conversion module according to claim 1, wherein the case further comprises at least one nozzle, the at least one nozzle is connected to the liquid inlet of the case, and the cooling liquid flows toward the first surface via the at least one nozzle.

3. The wavelength conversion module according to claim 1, further comprising:
   a plurality of heat transfer enhancement structures located on the second surface of the first plate and disposed corresponding to the wavelength conversion layer.

4. The wavelength conversion module according to claim 3, wherein the plurality of heat transfer enhancement structures are fin structures or porous materials.

5. The wavelength conversion module according to claim 1, wherein the first surface is a flat surface or a curved surface, and the first surface is recessed into the case toward the excitation light when the first surface is the curved surface.

6. The wavelength conversion module according to claim 1, further comprising:
   a reflective wheel located on a transmission path of the excitation light and comprising a substrate, an axis, and an actuator, wherein the actuator rotates the substrate around the axis, the substrate of the reflective wheel has a transmissive region and a reflective region, the transmissive region and the reflective region alternately enter into the transmission path of the excitation light when the substrate rotates, and the excitation light is transmitted to the wavelength conversion layer via the reflective wheel when the reflective region enters into the transmission path of the excitation light.

7. The wavelength conversion module according to claim 6, wherein the wavelength conversion layer has a plurality of wavelength conversion regions, the plurality of wavelength conversion regions are separated from each other, and the wavelength conversion module further comprises:
   a light transmission element located on the transmission path of the excitation light, wherein the excitation light is transmitted to one of the plurality of wavelength conversion regions via the reflective wheel when the reflective region of the reflective wheel enters into the transmission path of the excitation light, the excitation light passes through the reflective wheel and is transmitted to the light transmission element when the transmissive region of the reflective wheel enters into the transmission path of the excitation light, and the light transmission element transmits the excitation light to another of the plurality of the wavelength conversion regions.

8. The wavelength conversion module according to claim 1, further comprising:
   a reflective layer located on the case and located between the wavelength conversion layer and the case.

9. A projection device, comprising an illumination system, a light valve, and a projection lens, wherein:
   the illumination system provides an illumination light and comprises an excitation light source and a wavelength conversion module, wherein:
      the excitation light source provides an excitation light; and
      the wavelength conversion module receives the excitation light and comprises a case and a wavelength conversion layer, wherein
      the case has a liquid inlet, a liquid outlet, a cavity connecting the liquid inlet and the liquid outlet for circulation of a cooling liquid, and a first plate having a first surface and a second surface opposite to each other,
      the wavelength conversion layer is located on the first surface of the first plate of the case, wherein relative positions of the wavelength conversion layer and the excitation light remain unchanged, the second surface faces the cavity, and the cooling liquid is injected into the cavity from the liquid inlet, then flows over the second surface and is discharged from the liquid outlet,
      the cooling liquid is in a first flow direction when injected into the cavity from the liquid inlet and is in a second flow direction when discharged from the liquid outlet, the first flow direction and the second flow direction are parallel to each other, and the first flow direction and the second flow direction are perpendicular to a normal direction of the second surface;
   the light valve is located on a transmission path of the illumination light and forms the illumination light into an image light; and
   the projection lens is located on a transmission path of the image light and forms the image light into a projection light.

10. The projection device according to claim 9, wherein the case further comprises at least one nozzle, the at least one nozzle is connected to the liquid inlet of the case, and the cooling liquid flows toward the first surface via the at least one nozzle.

11. The projection device according to claim 9, wherein the wavelength conversion module further comprises:
   a plurality of heat transfer enhancement structures located on the second surface of the first plate and disposed corresponding to the wavelength conversion layer.

12. The projection device according to claim 11, wherein the plurality of heat transfer enhancement structures are fin structures or porous materials.

13. The projection device according to claim 11, wherein the excitation light forms a light spot on the first surface, the plurality of heat transfer enhancement structures are disposed corresponding to the light spot, and a size of a distribution range of the plurality of heat transfer enhancement structures on the second surface of the first plate is larger than a size of the light spot.

14. The projection device according to claim 9, wherein the first surface is a flat surface or a curved surface, and the first surface is recessed into the case toward the excitation light when the first surface is the curved surface.

15. The projection device according to claim 14, wherein the illumination system further comprises a lens element located between the excitation light source and the wavelength conversion module, wherein the lens element is a condenser lens when the first surface is the flat surface, and the lens element is a divergent lens when the first surface is the curved surface.

16. The projection device according to claim 9, wherein the wavelength conversion module further comprises:
   a reflective wheel located on a transmission path of the excitation light and comprising a substrate, an axis, and an actuator, wherein the actuator rotates the substrate around the axis, the substrate of the reflective wheel has a transmissive region and a reflective region, the transmissive region and the reflective region alternately enter into the transmission path of the excitation light when the substrate rotates, and the excitation light is transmitted to the wavelength conversion layer via the reflective wheel when the reflective region enters into the transmission path of the excitation light.

17. The projection device according to claim 16, wherein the wavelength conversion layer has a plurality of wavelength conversion regions, the plurality of wavelength conversion regions are separated from each other, and the wavelength conversion module further comprises:
   a light transmission element located on the transmission path of the excitation light, wherein the excitation light is transmitted to one of the plurality of wavelength conversion regions via the reflective wheel when the reflective region of the reflective wheel enters into the transmission path of the excitation light, the excitation light passes through the reflective wheel and is transmitted to the light transmission element when the transmissive region of the reflective wheel enters into the transmission path of the excitation light, and the light transmission element transmits the excitation light to another of the plurality of the wavelength conversion regions.

18. The projection device according to claim 9, wherein the wavelength conversion module further comprises:
   a reflective layer located on the case and located between the wavelength conversion layer and the case.

19. A wavelength conversion module, configured to receive an excitation light and comprising: a case and a wavelength conversion layer, wherein:
   the case comprises a liquid inlet, a liquid outlet, a cavity connecting the liquid inlet and the liquid outlet for circulation of a cooling liquid, and a first plate having a first surface and a second surface opposite to each other;

the wavelength conversion layer is located on the first surface of the first plate of the case, wherein relative positions of the wavelength conversion layer and the excitation light remain unchanged, the second surface faces the cavity, and the cooling liquid is injected into the cavity from the liquid inlet, then flows over the second surface and is discharged from the liquid outlet; and the cooling liquid is in a first flow direction when injected into the cavity from the liquid inlet and is in a second flow direction when discharged from the liquid outlet, the first flow direction and the second flow direction are substantially not parallel to each other, and the first flow direction is toward the first surface and has an angle with respect to the first surface.

20. The wavelength conversion module according to claim 19, wherein the angle is in a range of 45 degrees to 90 degrees.

21. A projection device, comprising an illumination system, a light valve, and a projection lens, wherein:

the illumination system provides an illumination light and comprises an excitation light source and a wavelength conversion module, wherein:

the excitation light source provides an excitation light; and the wavelength conversion module receives the excitation light and comprises a case and a wavelength conversion layer, wherein the case has a liquid inlet, a liquid outlet, a cavity connecting the liquid inlet and the liquid outlet for circulation of a cooling liquid, and a first plate having a first surface and a second surface opposite to each other, the wavelength conversion layer is located on the first surface of the first plate of the case, wherein relative positions of the wavelength conversion layer and the excitation light remain unchanged, the second surface faces the cavity, and the cooling liquid is injected into the cavity from the liquid inlet, then flows over the second surface and is discharged from the liquid outlet, the cooling liquid is in a first flow direction when injected into the cavity from the liquid inlet and is in a second flow direction when discharged from the liquid outlet, the first flow direction and the second flow direction are not parallel to each other, and the first flow direction is toward the first surface and has an angle with respect to the first surface;

the light valve is located on a transmission path of the illumination light and forms the illumination light into an image light; and the projection lens is located on a transmission path of the image light and forms the image light into a projection light.

22. The projection device according to claim 21, wherein the angle is in a range of 45 degrees to 90 degrees.

* * * * *